United States Patent
Ito et al.

(10) Patent No.: US 6,470,263 B2
(45) Date of Patent: Oct. 22, 2002

(54) AVERAGE VEHICLE SPEED CALCULATION DEVICE

(75) Inventors: Tomohiro Ito, Chita-gun; Shinji Hiraiwa, Kariya; Yoshimasa Saito, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/858,506

(22) Filed: May 17, 2001

(65) Prior Publication Data
US 2001/0044678 A1 Nov. 22, 2001

(30) Foreign Application Priority Data
May 18, 2000 (JP) ........................................ 2000-146529

(51) Int. Cl.[7] .............................................. G06F 19/00
(52) U.S. Cl. ............................. 701/201; 701/1; 702/146
(58) Field of Search ........................... 701/1, 201, 207, 701/208, 51; 702/145, 146, 147; 340/988, 994, 995

(56) References Cited

U.S. PATENT DOCUMENTS

| | | | | |
|---|---|---|---|---|
| 4,670,852 A | * | 6/1987 | Masaki et al. ............... | 702/146 |
| 5,928,308 A | | 7/1999 | Nanba et al. ................ | 701/211 |
| 5,983,153 A | * | 11/1999 | Poljansek .................... | 701/51 |
| 6,144,917 A | | 11/2000 | Walters et al. .............. | 701/204 |
| 6,285,950 B1 | * | 9/2001 | Tanimoto .................... | 701/201 |

FOREIGN PATENT DOCUMENTS

| JP | 8-22247 | 1/1996 |
|---|---|---|
| JP | A-10-197270 | 7/1998 |

* cited by examiner

Primary Examiner—Gary Chin
(74) Attorney, Agent, or Firm—Law Offices of David G. Posz

(57) ABSTRACT

In a navigation system for vehicles, a type of road a vehicle travels is determined based on a present position of a vehicle and road data, and a change in the type of road is determined. The road type is determined based on the type of link the vehicle travels referring to a table storing a relation between a link type and a road type. A travel distance is accumulated until the travel distance exceeds a predetermined determination reference, when the road type remains unchanged. An instant vehicle speed is calculated each time the vehicle travels the determination reference. An average vehicle speed is calculated by using the instant vehicle speed calculated for each road type. The average vehicle speed is used to notify an estimated time of arrival at a destination or a passing point.

10 Claims, 4 Drawing Sheets

AVERAGE VEHICLE SPEED CALCULATION DEVICE

CROSS REFERENCE TO RELATED APPLICATION

This application is based on and incorporates herein by reference Japanese Patent Application No. 2000-146529 filed May 18, 2000.

BACKGROUND OF THE INVENTION

The present invention relates to a technology for calculating an average vehicle speed.

A navigation system provides an appropriate travel route from a present position to a destination for use as a travel guidance, for instance, time of arrival at the destination or a passing point is estimated and notified for user's convenience. In estimating the arrival time, required time is calculated by dividing a distance from the present position to the destination or the passing point by an average vehicle speed.

For determining this average vehicle speed, U.S. Pat. No. 5,928,308 (JP-A-9-96539), for instance, teaches to set an average vehicle speed for each type of roads based on individual sense of users (drivers). In this case, the average vehicle speed deviates from an actual vehicle speed, because it is determined based on user's individual sense and fixed unless changed by the user.

It is also proposed to determine an average vehicle speed automatically from a distance actually traveled and time required to travel the distance (for instance, JP-A-8-22247). In this instance, the above deviation between the speed set with the driver's sense and the actual speed is eliminated. However, the average vehicle speed is calculated based on changes in distance from the present position to the destination irrespective of the types of roads. For instance, vehicle speeds are averaged even if the average vehicle speeds differ tens of kilometers per hour between a general road and an expressway. As a result, the average vehicle speed cannot be calculated accurately after the road type is changed when the type of road changes. Thus, the average vehicle speed cannot be calculated accurately if the required time is calculated by using the above vehicle speed.

SUMMARY OF THE INVENTION

Therefore, the present invention has an object to provide a technology for automatically calculating an average vehicle speed accurately.

According to the present invention, a road type determination unit determines a type of road a vehicle is traveling at present based on a present position of a vehicle. A travel distance calculation unit calculates a travel distance of the vehicle based on a change in the vehicle position. An instant vehicle speed calculation unit calculates, when the travel distance reaches a predetermined determination reference under a condition that the road type is the same, an instant vehicle speed of the vehicle for each road type based on the predetermined determination reference and time (required travel time) required to travel the predetermined determination reference. This may be calculated, for instance, by dividing the determination reference by the required travel time. An average vehicle speed calculation unit calculates an average vehicle speed for each road type by using the thus calculated instant vehicle speed.

Preferably, the required travel time used for calculation of the instant vehicle speed excludes time of rest of the vehicle.

It is preferred that the determination reference is set variably, and a rate of use of the instant vehicle speed in a calculation of the average vehicle speed is set variably.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
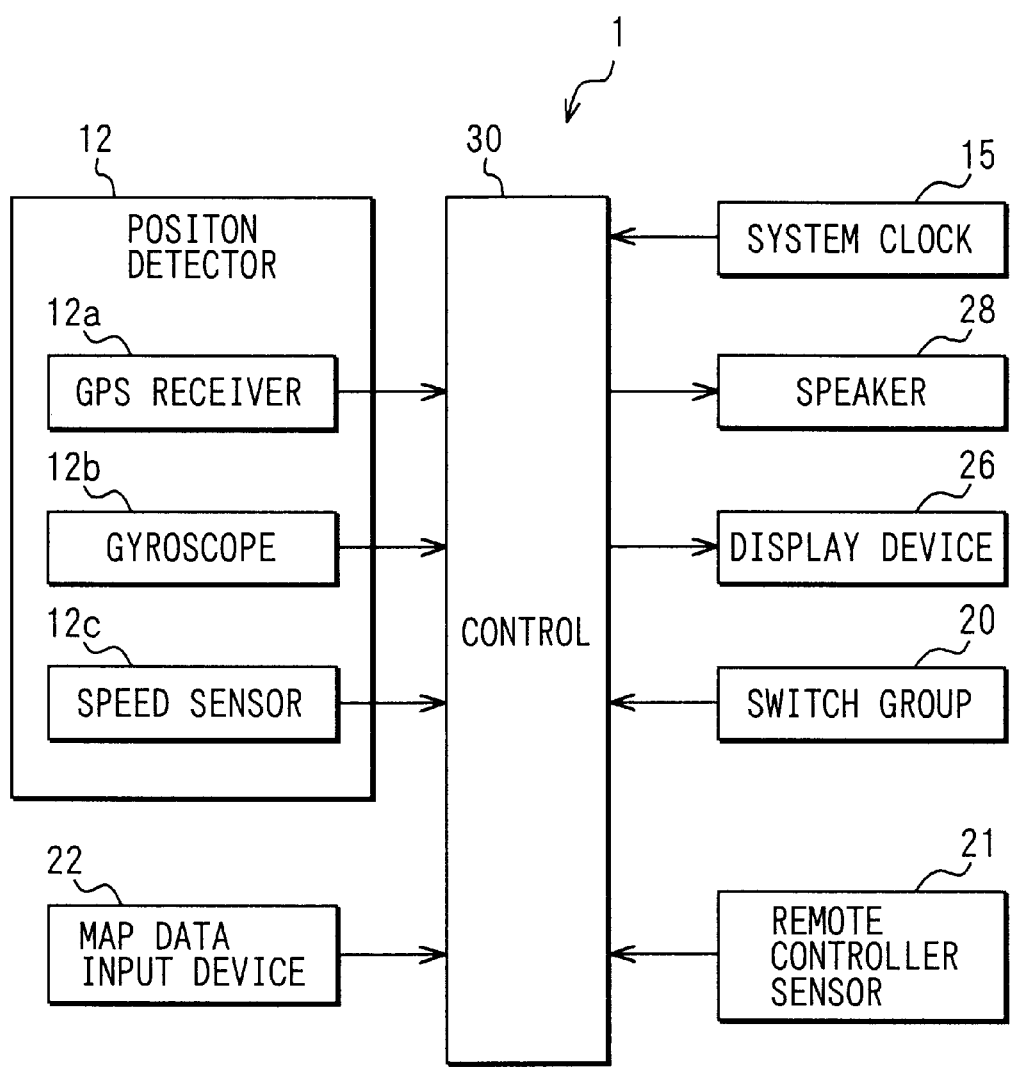
FIG. 1 is a block diagram showing a navigation system for vehicles according to an embodiment of the present invention.

Reference is made first to FIG. 1 showing a vehicle navigation system 1 having an average vehicle speed calculation function. The navigation system 1 has a position detector 12 for detecting a present position of a vehicle, a system clock 15, an operation switch group 20 for inputting various instructions to the system, a remote controller sensor 21 for inputting signals from a remote controller terminal (not shown) which is capable of inputting various instructions similar to the operation switch group 20, a map data input device 22, a display device 26 for providing various displays such as a map display screen or a TV screen, and a speaker 28. The navigation system 1 further has a navigation control circuit 30 which executes various processing in response to inputs from the position detector 12, the operation switch group 20, the map data input device 22 and the remote controller (not shown) thereby to control the display device 26 and the speaker 28.

The position detector 12 includes a GPS receiver 12a which receives radio signals transmitted from an artificial satellite for a GPS (global positioning system) through a GPS antenna to detect a position, a direction, a speed and the like of a vehicle, a gyroscope 12b which detects a magnitude of a revolving motion applied to the vehicle, and a vehicle speed sensor 12c which comprises a wheel speed sensor or the like to detect a travel distance of the vehicle. Because these sensors 12a to 12c has respective errors of different characteristics, they are used to compensate for the errors each other. Only some of the sensors 12a to 12c may be used if required accuracy is not high. Further, other sensors such as a geomagnetism sensor or a steering sensor may be used to detect an absolute direction based on the geomagnetism or a direction by accumulating a difference in angles between left and right rotations of a steering wheel.

The operation switch group 20 uses a touch-type switch device provided on a display screen integrally formed on the display device 26 or a mechanical key-type switch device provided around a periphery of the display device 26. The touch-type switch device comprises an infrared ray sensor disposed longitudinally and laterally over the screen of the display device 26. This sensor detects a two-dimensional coordinate values (X, Y) of a position of interruption of the infrared ray, when the infrared rays are interrupted by a finger or a touch pen, for instance. Thus, predetermined instructions can be input by directly touching the display screen.

The operation switch group 20 is a group of switches for manipulating the navigation system 1. Specifically, it includes switches for switching display contents presented on the display device 26 and switches for setting a travel route to a destination.

The map data input device 22 is for inputting from a storage medium map matching data to improve accuracy in position detection operation and various data including road data representing connections of roads. A CD-ROM or DVD is generally used as the storage medium because of its data storage capacity, but may be other mediums such as a memory card.

The road data are formatted with link information, node information and link-interconnection information. The link information includes various information regarding a link itself. For instance, such information includes "link ID" which is a specific number for identifying each link, "link type (link class)" which identifies road types, for instance, expressway, toll road, general road, attached road or the like, "start point coordinate" and "end point coordinate" of each link, "link length" indicating a length of each link. The node information also includes various information such as "node ID" which is a specific number for identifying each node connecting links, no right or left-turn at intersections or availability of traffic lights. The link-interconnecting information includes data such as passable or impassable due to one-way traffic.

The display device 26 is a color display device in this embodiment. It displays on its screen in a superimposed manner a mark which indicates the present position of a vehicle detected by the position detector 12, road data input from the map data input device 22, and additional data displayed on the map. The additional data include a travel guidance route, names, signs or the like. It also displays an enlarged view of intersections, a schematic view of branching roads, or a notification of cautions.

The speaker 28 provides users with voiced information such as a variety of guides processed by the navigation control circuit 30.

The navigation control circuit 30 is constructed with a well-known microcomputer which includes a CPU, ROM and RAM, and controls the entire operation of the system. The internal construction of the navigation control circuit 30 will be described with reference to a functional block diagram shown in FIG. 2.

Figure 2:
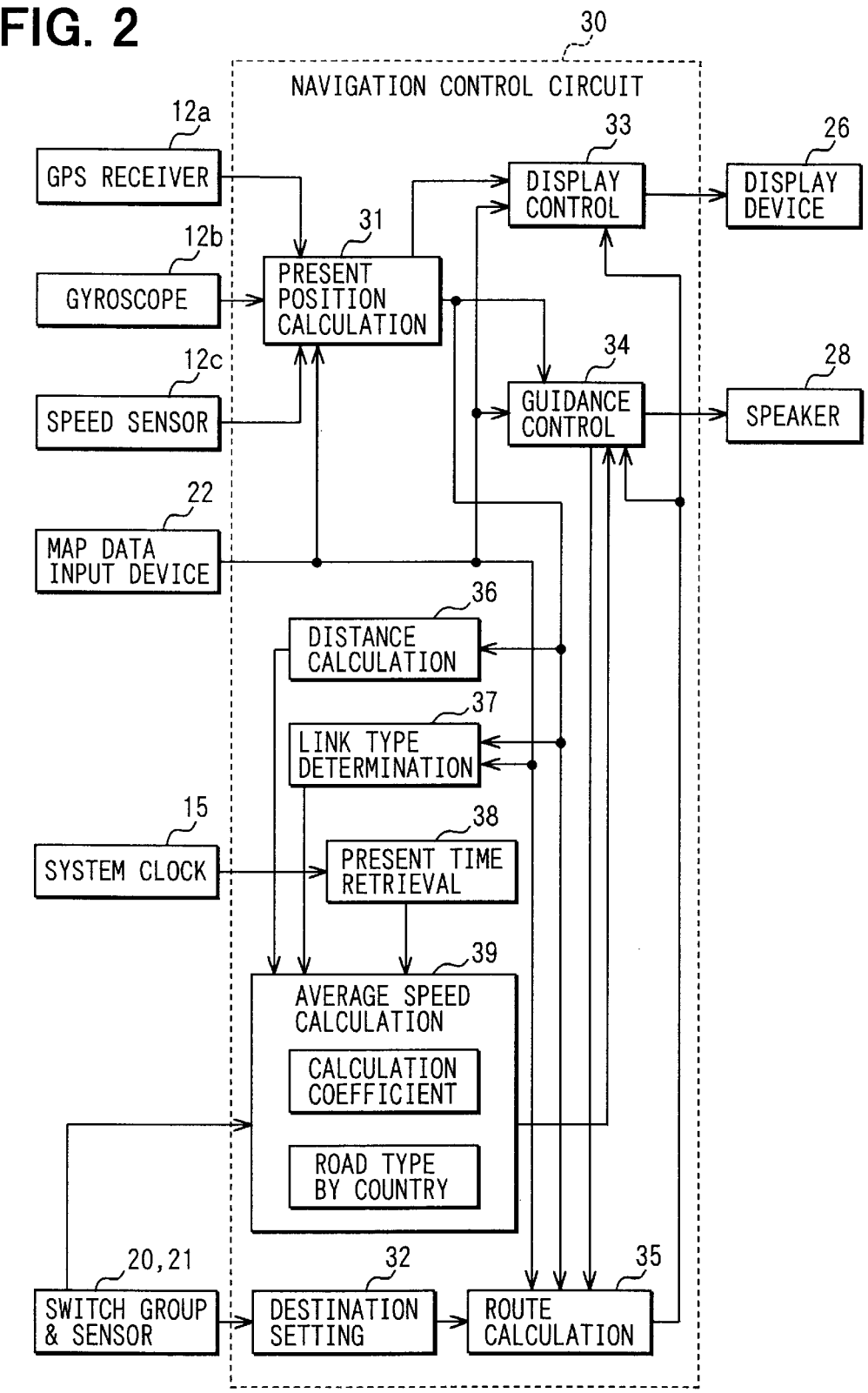
FIG. 2 is a functional block diagram showing a navigation control circuit in the embodiment shown in FIG. 1.

As shown in FIG. 2, the navigation control circuit 30 includes a present position calculation unit 31, a destination setting unit 32, a display control unit 33, a guidance control unit 34, a travel route calculation unit 35, a travel distance calculation unit 36, a link type determination unit 37, a present position retrieval unit 38, an average vehicle speed calculation unit 39.

The present position calculation unit 31 calculates a present position based on inputs from the GPS receiver 12a, gyroscope 12b and vehicle speed sensor 12c as well as the map data retrieved from the storage medium through the map data input device 22. The destination setting unit 32 stores therein the destination input through the operation switch group 20 or the remote controller sensor 21.

The travel route calculation unit 35 calculates an optimal travel route from the present position calculated by the present position calculation unit 31 to the destination. Dijikstra method may be used to calculate this optimal travel path. The display control unit 33 drives the display device 26 to display with highlight the travel path calculated by the travel route calculation unit 33 on the road data. The guidance control unit 34 detects from outputs of the present position calculation unit 31 a present position in the travel route calculated by the travel route calculation unit 35, and provides a voiced guidance such as a travel direction of the travel route through the speaker 28.

The travel distance calculation unit 36 calculates a travel distance from changes in the positions output from the present position calculation unit 31, and outputs the travel distance to the average vehicle speed calculation unit 39. The link type determination unit 37 determines the link type of a road on which the vehicle is located at present by using the position output from the present position calculation unit 31 and the map data retrieved from the storage medium through the map data input device 22, and outputs the determined link type to the average vehicle speed calculation unit 39. The present time retrieval unit 38 retrieves the present time based on input data from the system clock 15.

The average vehicle speed calculation unit 39 calculates the average vehicle speed based on the travel distance input from the travel distance calculation unit 36, the link type input from the link type determination unit 37 and the present time input from the present time retrieval unit 38. This processing for the average vehicle speed calculation will be described below. The average vehicle speed calculation unit 39 stores therein tables of vehicle speed calculation coefficients and country-by-country road types. The vehicle speed calculation coefficients are variable by manipulation of the operation switch group 20 or the remote controller sensor 21.

The table of the country-by-country road types is defined as follows. Although the average vehicle speed is calculated with respect to each road type, only two types are defined as a general road and an expressway in this embodiment. However, the link type of an expressway may be classified into a suburban expressway and a metropolitan expressway. Further, the link type of a general road may be classified into a national road, prefectural road and the like. Therefore, this table defines which link types are classified into a general road and an expressway, respectively. This table is provided for each country, because the similar roads may be classified with different link types among the countries. For instance, a connection road (ramp way) is classified as a general road in Japan, but it may be classified as an expressway in other countries. Thus, the connection road can be classified as a general road in Japan by this link type table.

The processing of the average vehicle speed calculation executed by the average vehicle speed calculation unit 39 will be described next with reference to a flow diagram of FIG. 3.

At first step S10, the unit 39 retrieves basic information. The basic information includes the travel distance, present time and travel road condition including the link type. These information are input from the travel distance calculation unit 36, retrieval unit 38 and link type determination unit 37. The unit 39 checks whether these values have been initialized (S20). The unit 39 advances its processing to S180 and initializes the travel distance, present time and travel road condition, when the basic information has not been initialized yet (S20: NO), thus ending this routine. The unit 39 advances its processing to S30 and calculates the travel time and distance between the previous time and the present time from the difference between the previous and present basic information, when the basic information has been initialized (S20: YES).

The unit 39 checks at S40 whether the vehicle is traveling based on the travel distance. The unit 39 checks whether the present road type has changed (S50), when the check result indicates that the travel distance is larger than 0, that is, the vehicle is in travel (S40: YES). The road type is classified into two in this embodiment, that is, general road and expressway. The road type is determined, based on the table of the country-by-country road type, to which the link information of the retrieved basic information corresponds.

The unit 39 checks (S60) whether the travel distance has exceeded a predetermined determination reference, when the road type has not changed (S50: NO). The unit 39 accumulates the travel time and distance (S120) and ends this routine, when the travel distance is not in-excess of the determination reference. The unit 39 calculates the instant vehicle speed Va using the following equation, when the travel distance is in excess of the determination reference.

$$Va=La/Ta$$

Va: instant vehicle speed
La: travel distance
Ta: travel time required

The travel distance La in the above equation is the determination reference, because the instant vehicle speed Va is calculated each time the vehicle travels the determination reference. A default value of this determination reference is, for example, 15 km. The determination reference is set as the default value, because it is one of coefficients used to calculate the vehicle speed and variably set by manipulating the operation switch group or the remote controller sensor 21.

The unit 39 then checks (S80) whether the road type is a general road, after the calculation of the instant vehicle speed at S70. The unit 39 advances its processing to S90 and calculates a general road average vehicle speed, when it is the general road (S80: YES). The unit 39 advances its processing to S100 and calculates an expressway average vehicle speed, when it is the expressway (S80: NO). These average vehicle speeds are calculated as follows.

$$Vn=V(n-1)+k\{Va-V(n-1)\}$$

V(n): present average vehicle speed
V(n−1): previous average vehicle speed
k: weighing coefficient The weighing coefficient k in the above equation is a rate of use of the instant vehicle speed Va in the calculation of the present average vehicle speed. It is also one of the coefficients used to calculate the vehicle speed, and is variably set by manipulating the operation switch group 20 and the remote controller sensor 21. Some measures should be taken in the above calculation of the average vehicle speed V(n) to prevent V(n)=0 km/h. Specifically, the presently calculated average vehicle speed V(n) is not stored and the previous average vehicle speed V(n) is maintained, when the average vehicle speed V(n) calculated as above is likely to become close to 0 km/h (for instance, less than 1 km/h).

After calculation of the average vehicle speed V(n) at S90 or S100, the unit 39 resets the accumulated travel time and distance and initializes the same (S110) thus ending this routine.

The processing of S60 through S120 is executed, when the road type does not change (S50: NO). When the road type changes (S50: YES), the unit 39 accumulates the travel distance (S130) after the change in the road type. The unit 39 ends this routine when the travel distance is less than the predetermined determination reference. The unit 39 changes the road type (S150) and resets the accumulated travel distance (S160) at S130, only when the travel distance exceeds the predetermined distance (S140: YES).

As shown with S130 through S160, even when the road type is changed, the road type change is not effected immediately but the road type is changed to a new one after the road change condition has continued over a predetermined distance. This is based on the following reasons. That is, the link type determination unit 37 determines the link type of the road where the vehicle is at present based on the position output from the present position calculation unit 31 and the map data retrieved from the storage medium through the map data input device 22.

This determination may sometimes cause error. For instance, if the matching is not made accurately between the detected position and the road data, the travel on a roadside may be determined to be a travel outside the road. Further, the vehicle may leave the road to a roadside shop for a moment but returns to the road in a short time for some reason. If the road type is changed in case of such a temporary road change, the calculation of the instant vehicle speed at S70 and the calculation of the average vehicle speeds at S90 and S100 will not be possible. Therefore, the road type change is effected only after the changed road condition has continued over the predetermined distance. However, the predetermined distance is set preferably to not a long distance, because a response to the actual change in the road type if it is set too long.

The above S50 through S160 are executed when the vehicle is in travel (S40: YES). When the vehicle is at rest (S40: NO), the processing proceeds to S170 to effect the rest setting. In this rest setting, the received position and-time information are stored, because the distance and the time are calculated from the differences between the previous values and the present values in the calculation of the average vehicle speed.

In this embodiment, the position detector 12 corresponds to position detector, and the link type determination unit 37 and the average vehicle speed calculation unit 39 corresponds to road type determination unit. Further, the travel distance calculation unit 36 corresponds to travel distance calculation unit, and the average vehicle speed calculation unit 39 corresponds to the instant vehicle speed calculation unit and average vehicle speed calculation unit.

As described above, the vehicle-mounted navigation system 1 of this embodiment automatically determines the road type based on the position of the vehicle and calculates the instant vehicle speed for each road type. With this instant vehicle speed Va calculated for each road type, the average vehicle speed V(n) can be calculated appropriately for each road type. That is, the average vehicle speed can be calculated appropriately for each road type without deviation from the actual vehicle average vehicle speed which is caused in the conventional method by which the average vehicle speed for each road type is set based on the sense of a user.

The average vehicle speed thus calculated can be used in various ways. For instance, it can generally be used to estimate and notify the time of arrival to a destination or a passing point. In estimating the time of arrival, a required time is determined by dividing a distance from the present position to the destination or the passing point by the average vehicle speed. Because the average vehicle speed is calculated appropriately for each of the general road and the expressway even when the travel route includes both, it becomes possible on the whole to estimate the time of arrival appropriately.

Further, in this embodiment, it is made possible to vary by manipulating the operation switch group 20 and the remote controller sensor 21 the vehicle speed calculation coefficients, that is, the determination reference vehicle speed La used for calculating the instant vehicle speed Va and the weighing coefficient k used for calculating the average vehicle speed. For instance, although the influence of instant vehicle speed change can be removed more as the determination reference La is set longer, the instant vehicle speed cannot be calculated until the vehicle travels the determination reference La. The instant vehicle speed cannot be calculated unless the vehicle travels 15 km, because its default value is set to 15 km. As a result, the instant vehicle speed cannot be used to calculate the average vehicle speed V(n), or can be used with delay. For instance, in case the vehicle travels only in nearby area, certain time is required to calculate the average speed.

For this reason, it is preferred to set the determination reference La to a relatively small value to enable calculation of the average vehicle speed at an early time point, in case the vehicle travels only a limited distance. It is however preferred to set the determination reference La to a relatively large value to eliminate the influence of changes in the vehicle speed, in case the vehicle travels a long distance.

Figure 4:
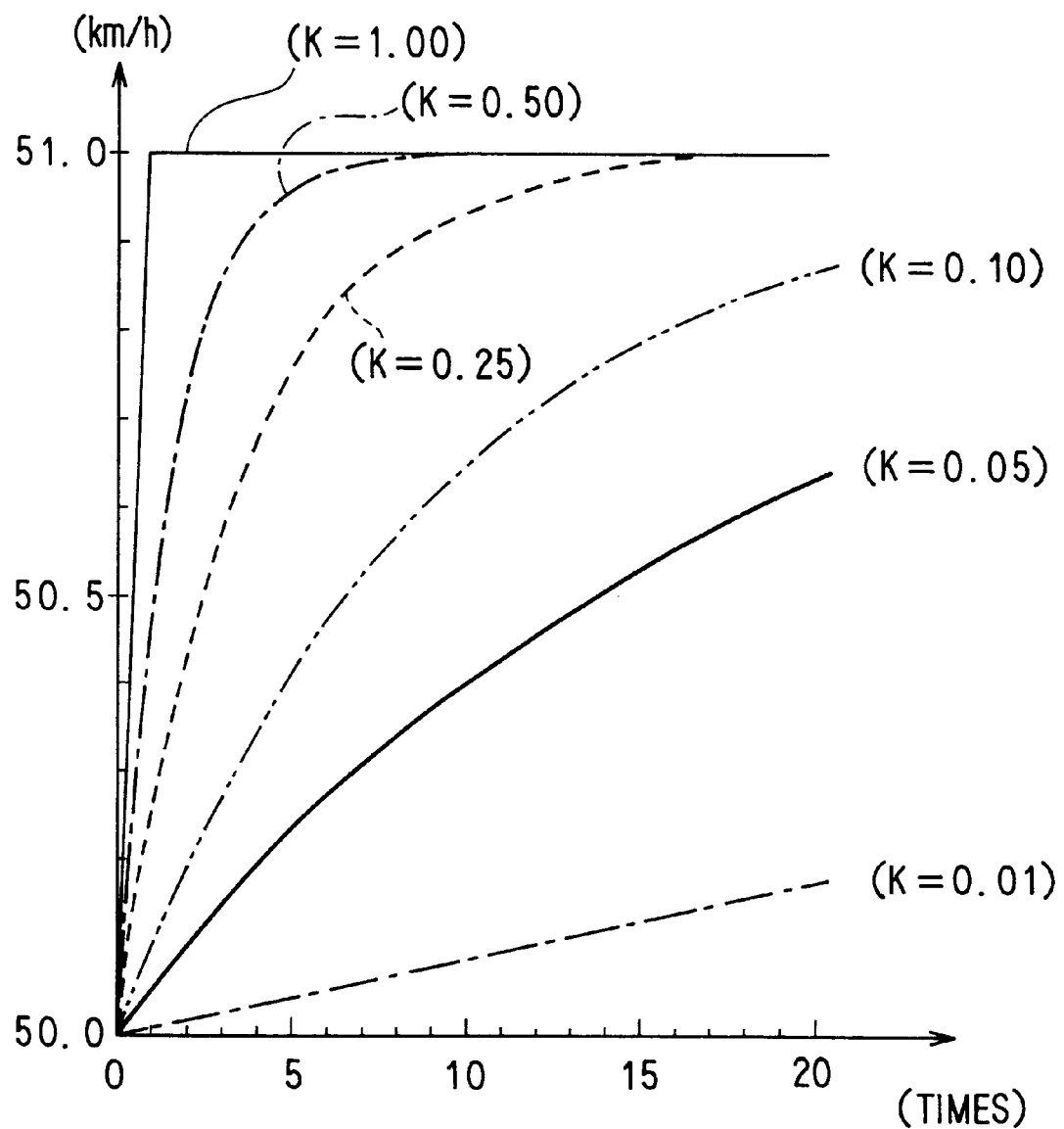
FIG. 4 is a graph showing changes in an average vehicle speed with different weighing coefficient in an average vehicle speed calculation equation used in the processing shown in FIG. 3.

The influence of the change in the instant vehicle speed can be eliminated with ease by setting the weighing coefficient k to a small value. For instance, FIG. 4 shows difference among the average speeds with respect to weighing coefficients, when the average vehicle speed changes from 50 km/h to the instant vehicle speed 51 km/h. The weighing coefficient is set to six values, 1.00, 0.50, 0.25, 0.10, 0.05 and 0.01. For instance, with k=1.00, the average vehicle speed is 51 km/h when the first instant vehicle speed 51 km/h. With k=0.01, the average vehicle speed is less than 50.2 km/h even after the instant vehicle speed 51 km/h is used 20 times.

Thus changing the weighing coefficient k is particularly effective when the determination reference La is set to a relatively small value. That is, the influence of the determination reference La is reduced by setting the weighing coefficient k to a small value, because the instant vehicle speed changes largely and the average vehicle speed is subjected to the influence of the instant vehicle speed Va when the determination reference La is set small.

Although the determination reference La and the weighing coefficient k may be varied arbitrarily by a user, it is preferable that these values are varied by car dealer staff after ascertaining user's vehicle drive style or purpose because these values should be set based on expert knowledge to some extent.

The above embodiment may be modified as follows.

Although roads are classified into two, general road and expressway, in the above embodiment, they may be classified into more types.

The average vehicle speed differs depending on not only the above types of general roads but also drive mode of drivers. That is, the average vehicle speed differs between relatively slow driving persons such as beginner, aged or careful drivers and relatively fast driving persons. Therefore it will be effective to calculate the average vehicle speed in correspondence with each driver. In this instance, a user ID is set by manipulating the operation switch group 20 or the remote controller sensor 21, the average vehicle speed calculation unit 39 stores the average vehicle speed for each user ID. Thus, the time of arrival at the destination can be estimated appropriately depending on drivers.

Figure 3:
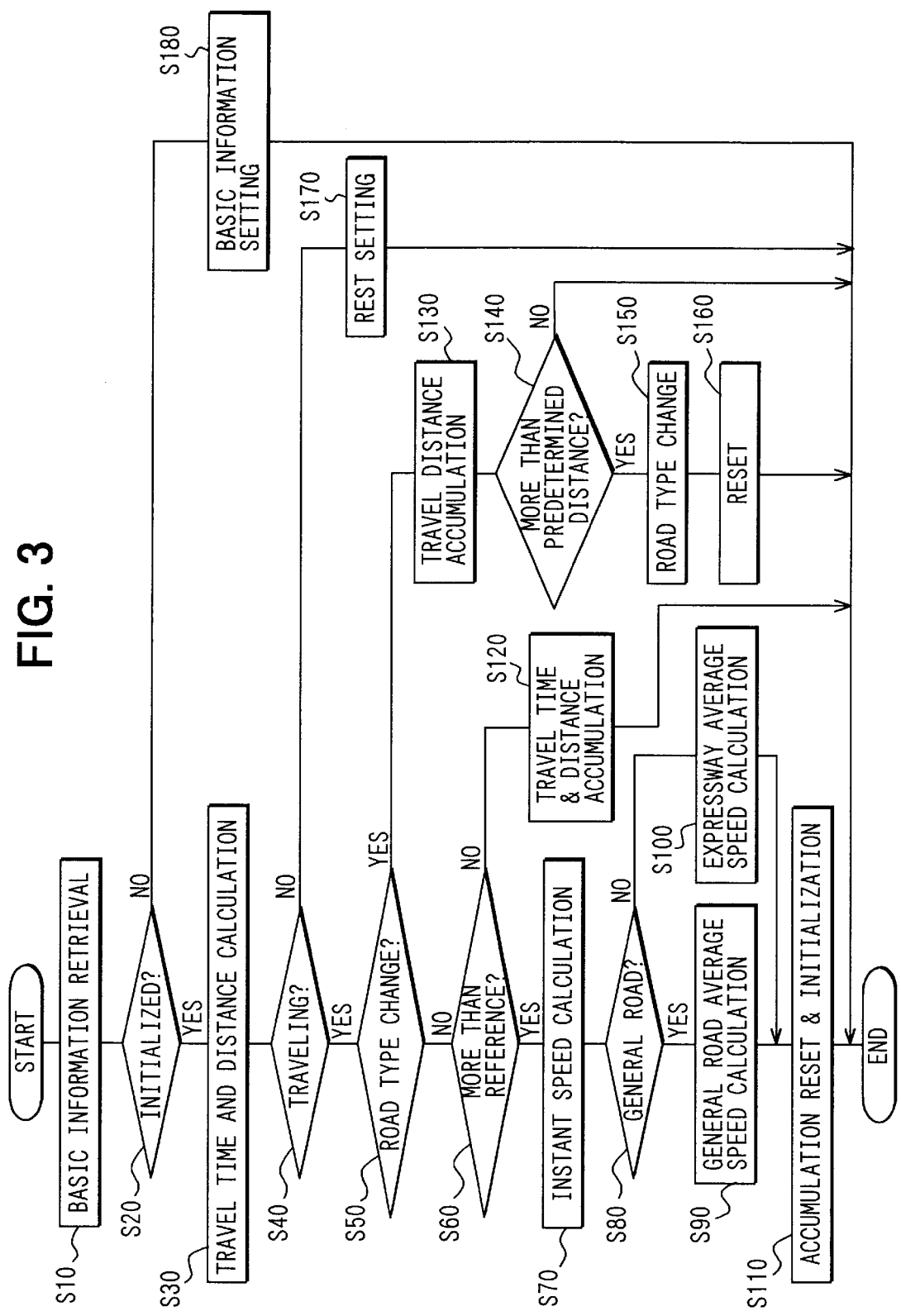
FIG. 3 is a flow diagram showing average vehicle speed calculation processing executed by the navigation control circuit shown in FIG. 2.

It is checked at S60 in FIG. 3 in the above embodiment whether the vehicle has traveled the determination reference. However the instant vehicle speed Va may be calculated when a predetermined time elapses, even in case that the vehicle has not traveled the determination reference. The average speed cannot be calculated soon, when the determination reference is set large and the vehicle travels at low speeds. Therefore the average vehicle speed is calculated when the vehicle travels the required time even in the case of travel of less than the required distance, so that the average vehicle speed may be calculated even in such a case.

Further modifications and alterations are also possible without departing from the spirit of the invention.

What is claimed is:

1. An average vehicle speed calculation device comprising:

a position detector for detecting a position of a vehicle;

a road type determination unit for determining a type of road the vehicle is traveling based on the position detected by the position detector;

a travel distance calculation unit for calculating a travel distance of the vehicle based on a change in the position detected by the position detector;

an instant vehicle speed calculation unit for calculating, when the travel distance calculate by the travel distance calculation unit reaches a predetermined determination reference under a condition that the road type determined by the road type determination unit is the same, an instant vehicle speed of the vehicle for each road type based on the predetermined determination reference and time required to travel the predetermined determination reference; and an average vehicle speed calculation unit for calculating an average vehicle speed for each road type by using the instant vehicle speed calculated by the instant vehicle speed calculation unit and a previous average vehicle speed.

2. The average vehicle speed calculation device as in claim 1, wherein the required travel time used for calculation of the instant vehicle speed by the instant vehicle speed calculation unit excludes the time when the vehicle is at rest.

3. The average vehicle speed calculation device as in claim 1, wherein the determination reference used for calculation of the instant vehicle speed by the instant vehicle speed calculation unit is arbitrarily variable.

4. The average vehicle speed calculation device as in claim 1, wherein a rate of use of the instant vehicle speed calculated by the instant vehicle speed calculation unit in a calculation of the average vehicle speed is arbitrarily variable.

5. The average vehicle speed calculation device as in claim 1, wherein:

a plurality of persons is registrable separately as drivers of the vehicle; and the instant vehicle speed and the average vehicle speed using the instant vehicle speed are calculated for each of the registered drivers.

6. The average vehicle speed calculation device as in claim 1, wherein:

road data, which has link information of links connecting nodes, connection information between the links and type information of the links, are provided; and the road type determination unit determines the road type based on types of links which correspond to the detected position.

7. The average vehicle speed calculation device as in claim 1, wherein:
   a type matching relation for classifying the link types into predetermined road types is stored; and
   the road type determination unit determines the road type based on the type matching relation.

8. The average vehicle speed calculation device as in claim 7, wherein:
   the type matching relation is set for each country.

9. The average vehicle speed calculation device as in claim 1, wherein the road type determination unit determines that the road type has changed after the changed road type continues for a predetermined distance in case of a road type change.

10. A storage medium storing a computer-readable program to operate a computer system as the road type determination unit, the travel distance calculation unit, the instant vehicle speed calculation unit and the average vehicle speed calculation unit of the average vehicle speed calculation device as in any one claims 1 to 9.

* * * * *